UNITED STATES PATENT OFFICE.

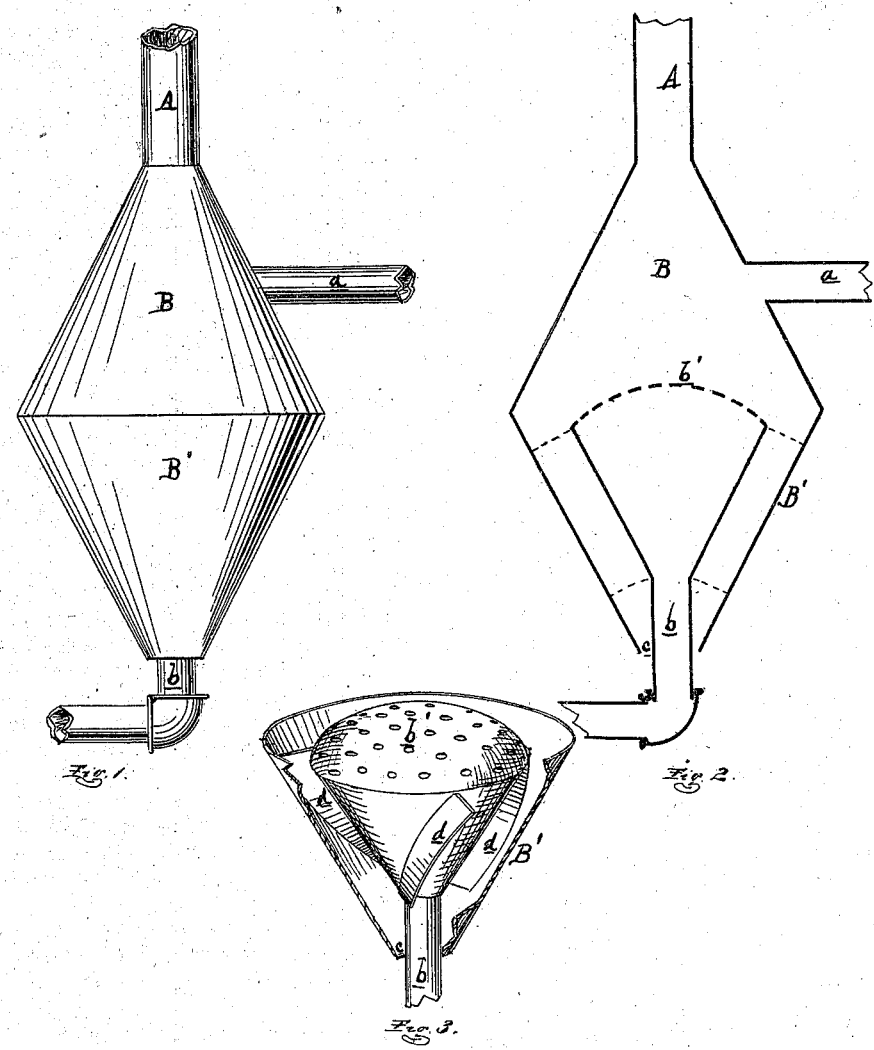

AMOS AGNER, OF OTTAWA, OHIO.

IMPROVEMENT IN DEVICES FOR STEAMING WHEAT BEFORE GRINDING.

Specification forming part of Letters Patent No. 131,926, dated October 8, 1872.

*To all whom it may concern:*

Be it known that I, AMOS AGNER, of Ottawa, in the county of Putnam and State of Ohio, have invented a new and useful Improvement in a Device for Steaming Wheat before Grinding; and I do declare that the following is a true and accurate description thereof, reference being had to the accompanying drawing and to the letters of reference marked thereon, and being a part of this specification, in which—

Figure 1 is an elevation of my device; Fig. 2 is a vertical section of the same; and Fig. 3 is a perspective view of the lower half, with a portion of the exterior wall broken away to show the interior arrangement of parts.

Like letters of reference indicate corresponding parts in the several figures.

This invention has for its object to provide a device by means of which wheat may be steamed and dampened as it is fed to the stones for grinding. By the use of this device, which is more especially designed to be used when grinding dry and dusty wheat, the bran is partially agglutinized, and does not grind as fine as when the wheat is dry, enabling the miller to grind closer and yet make a whiter flour and about one pound more of it to the bushel of wheat. The invention consists in a peculiar chamber interposed between the smut-mill and the hopper of the stones, through which the wheat passes, and is met with numerous jets of live steam which heat and dampen it before passing to the stones, the volume of steam being regulated to the requirements of the grain, as more fully hereinafter set forth.

In the drawing, A represents the feed-spout leading from the smut-mill to the stones. This spout is cut at any point between the cleaning apparatus and the stones, to receive a sheet-metal chamber in the form of two conical frustums joined at their bases, and represented at B B'. From one side of the former a pipe, *a*, conducts away any surplus steam not absorbed by the grain falling through. In the bottom of the lower cone a pipe, *b*, enters, conveying live steam from the boiler of the mill, and terminates in a perforated rose, *b'*, about the middle of the chamber. An annular space, *c*, is left between the bottom of the chamber and the pipe *b*, through which the steamed wheat issues and falls into the hopper of the stones, if placed above it, or a spout may convey the wheat thereto, if located elsewhere. Between the bell-mouth of the rose and the walls of the cone B' are placed several spiral wings or guides, *d*, which serve to support the parts in position, and also to retain the grain in the case long enough to have the steam act upon it. The flow of steam to the interior of the chamber may be regulated by a suitable valve in the steam-pipe, or the steam may be shut off when grinding new or damp grain.

As the grain falls on the perforated rose *b'* it is met by numerous jets of steam, which soften, damp, and toughen the cuticle of the berry without affecting the farinaceous body thereof. The result is that the bran does not break into fine particles to "speck" and darken the flour, enabling the miller to set his stones closer than heretofore, and to get at least one pound of flour more to the bushel of wheat than he otherwise would. At the same time the grinding can be done with a less expenditure of power, as the action of the steam is to soften the flinty covering of the berry.

The grain is dampened with perfect uniformity throughout, which cannot be accomplished by sprinkling it with water, as in that case some berries are over-soaked and others are not dampened at all.

I am aware that in California, and perhaps elsewhere, wheat has been steamed in bins constructed for the purpose, and afterward stirred, or stirred while being steamed, by suitable mechanical appliances; and, while I disclaim broadly the steaming of the wheat before grinding it, What I do claim as my invention is—

The construction and arrangement with relation to the feed-spout A, of the chamber B B', steam-pipe *b*, rose *b'*, wings or guides *d*, and escape-pipe *a*, substantially as and for the purposes set forth.

AMOS AGNER.

Witnesses:
   H. F. EBERTS,
   H. S. SPRAGUE.